United States Patent [19]

Patton et al.

[11] Patent Number: 5,920,612
[45] Date of Patent: Jul. 6, 1999

[54] METHOD AND APPARATUS IN A DISTRIBUTED MESSAGING SYSTEM FOR REDUCING NETWORKING TRAFFIC REQUIRED TO OBTAIN SUBSCRIBER INFORMATION

[75] Inventors: Mark Rondell Patton, Grapevine, Tex.; Mark James Wickham, Seattle, Wash.; Kim Lorraine English, Noth Richland Hills, Tex.

[73] Assignee: Motorola, Inc., Schaumburg, Ill.

[21] Appl. No.: 08/971,811

[22] Filed: Nov. 17, 1997

[51] Int. Cl.[6] .......................... H04M 11/00; H04Q 7/00; G08B 5/22
[52] U.S. Cl. ................. 379/90.01; 455/31.2; 340/825.44
[58] Field of Search .............................. 379/88.09, 88.11, 379/88.12, 88.15, 90.01, 102.02; 340/825.44, 825.26, 825.27; 455/31.2, 38.1, 400, 432, 445, 518

[56] References Cited

U.S. PATENT DOCUMENTS

| 5,543,785 | 8/1996 | Vatt et al. | 455/38.1 |
| 5,694,393 | 12/1997 | Kaye | 455/518 |
| 5,736,933 | 4/1998 | Segal | 340/825.44 |
| 5,740,533 | 4/1998 | Lin | 340/825.44 |

*Primary Examiner*—Curtis A. Kuntz
*Assistant Examiner*—George Eng
*Attorney, Agent, or Firm*—R. Louis Breeden

[57] ABSTRACT

Dummy subscriber information records (226) are programmed (502) into a database of a local controller (110), and templates (222) are also stored (504) in the database. Each template includes a range of subscriber numbers (406, 408) belonging to subscribers of a home controller (120) different from the local controller, and a pointer (412) to a corresponding dummy subscriber information record (226). When the local controller receives (506), from a message originator, a subscriber number that falls within the range of subscriber numbers of one of the templates, the local controller obtains (508) subscriber information (418, 420) from one of the dummy subscriber information records through the pointer of the one of the templates.

16 Claims, 4 Drawing Sheets

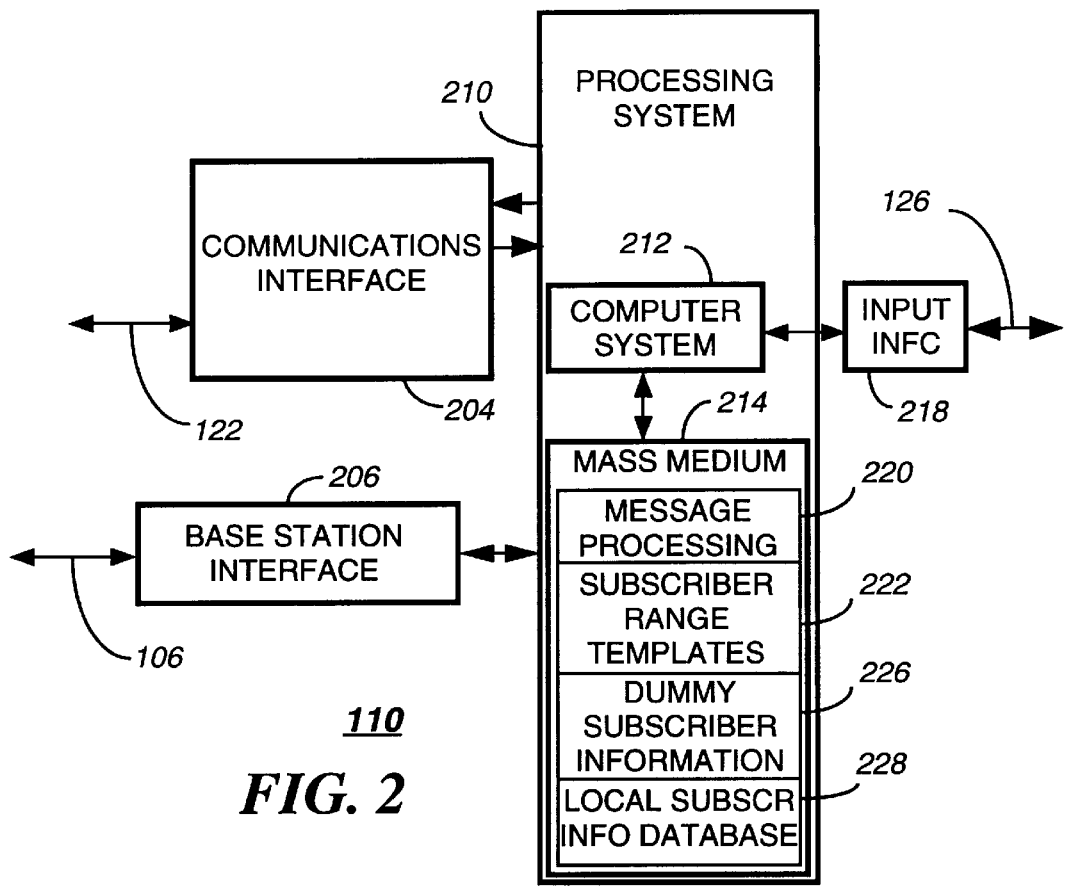
FIG. 2
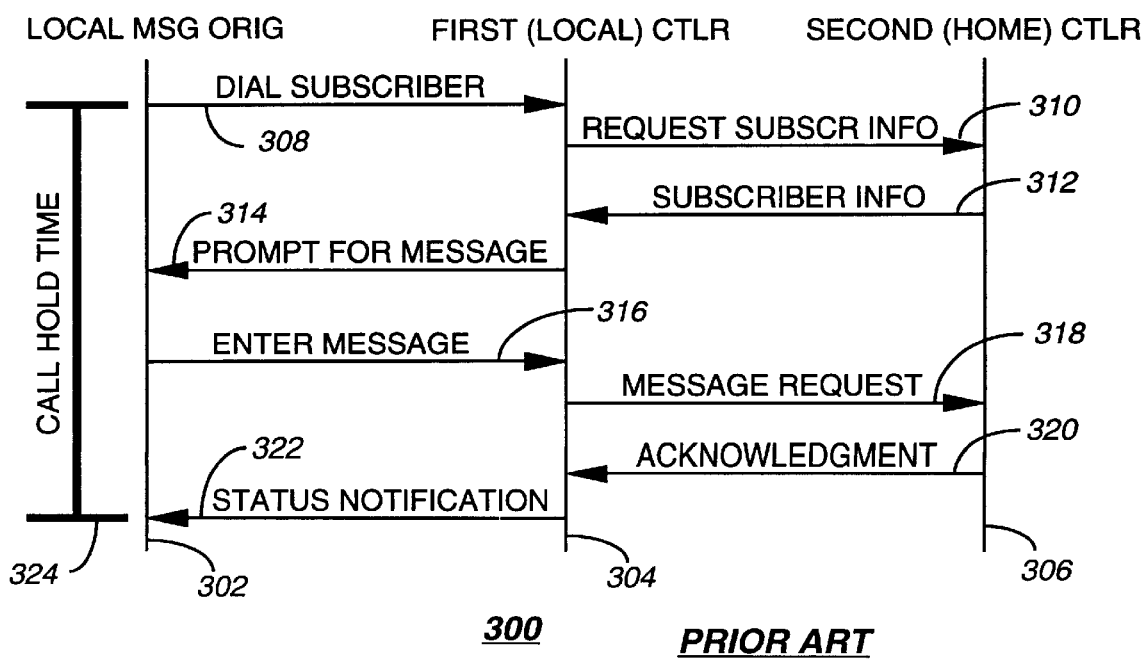
FIG. 3 — PRIOR ART 5,920,612

METHOD AND APPARATUS IN A DISTRIBUTED MESSAGING SYSTEM FOR REDUCING NETWORKING TRAFFIC REQUIRED TO OBTAIN SUBSCRIBER INFORMATION

FIELD OF THE INVENTION

This invention relates in general to messaging systems, and more specifically to a method and apparatus in a distributed messaging system for reducing networking traffic required to obtain subscriber information.

BACKGROUND OF THE INVENTION

Distributed messaging systems have become increasingly popular in recent years as more subscribers have demanded nationwide and global messaging coverage. Such systems have allowed a message originator to enter a message at a number of conveniently positioned local controllers, while the subscriber's "home" controller keeps track of the subscriber and directs the delivery of the message.

Before accepting a message for delivery, the local controller requires certain information about the subscriber. For example, does the subscriber have numeric, alphanumeric, voice, or some other receiving capability? What is the maximum possible message length? Some prior art systems have required communications to take place between the local controller and the home controller to answer such questions before accepting the message. Unfortunately, the required communications and the resultant network traffic have increased the holding time of the message origination call, have delayed delivery of the message, and further have increased the operational costs of the messaging system. Other prior art systems have taken the approach of requiring all messages entered at the local controller to be of a single type and maximum message length, e.g., numeric and 20 characters. Needless to say, this approach lacks the flexibility to accommodate today's variety of subscriber unit capabilities for messaging.

Thus, what is needed is a method and apparatus that can minimize the delays and costs associated with communications required to obtain subscriber information for messages entered at local controllers of distributed messaging systems, while also providing sufficient flexibility to accommodate a variety of subscriber unit types and capabilities.

SUMMARY OF THE INVENTION

An aspect of the present invention is a method in a distributed messaging system for reducing networking traffic required to obtain subscriber information. The method comprises the steps of programming a plurality of dummy subscriber information records into a first database of a first controller; and storing in the first database a plurality of templates, a template comprising a range of subscriber numbers belonging to a second plurality of subscribers having their subscriber information programmed into a second database of a second controller, the template further comprising a pointer to a corresponding one of the plurality of dummy subscriber information records. The method further comprises receiving, by the first controller from a message originator, a subscriber number that falls within the range of subscriber numbers of one of the plurality of templates; and obtaining the subscriber information from a corresponding one of the plurality of dummy subscriber information records through the pointer of the one of the plurality of templates.

Another aspect of the present invention is a first controller in a distributed messaging system for reducing networking traffic required to obtain subscriber information. The first controller comprises an input interface for receiving a message from a message originator, and a processing system coupled to the input interface for processing the message, the processing system including a memory for storing a first database. The first controller further comprises a communications interface coupled to the processing system and coupled to a second controller for communicating with the second controller. The first database includes a plurality of dummy subscriber information records and also includes a plurality of templates, a template comprising a range of subscriber numbers belonging to a second plurality of subscribers having their subscriber information programmed into a second database of a second controller, the template further comprising a pointer to a corresponding one of the plurality of dummy-subscriber information records. The processing system is programmed to obtain the subscriber information from a corresponding one of the plurality of dummy subscriber information records through the pointer of one of the plurality of templates, in response to receiving from the message originator a subscriber number that falls within the range of subscriber numbers of the one of the plurality of templates.

BRIEF DESCRIPTION OF THE DRAWINGS

FIG. 2 is an exemplary electrical block diagram of a local controller in accordance with the present invention.

FIG. 3 is a timing diagram depicting communications required in a prior art messaging system for entering a message at a local controller.

DETAILED DESCRIPTION OF THE DRAWINGS

Figure 1:
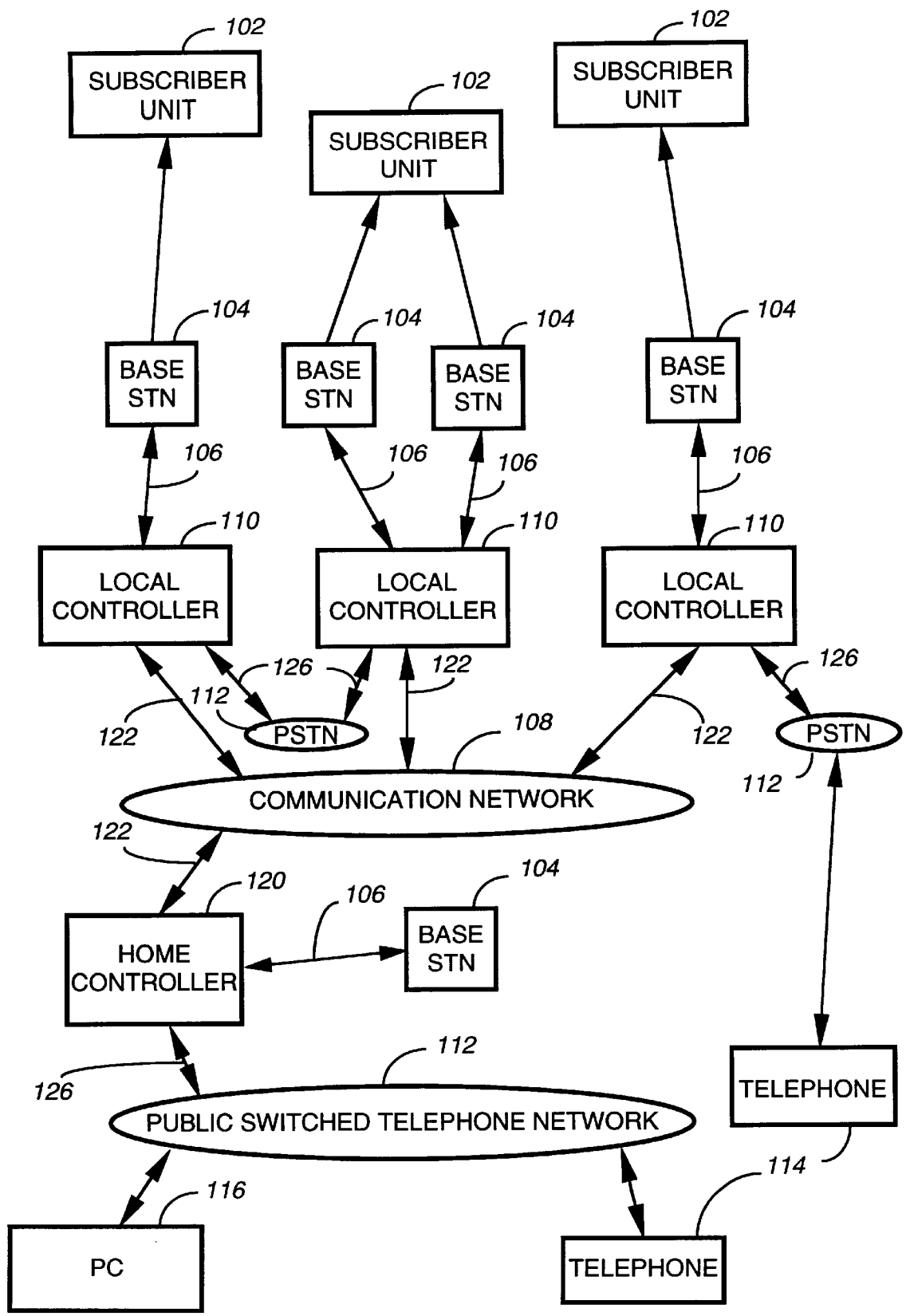
FIG. 1 is an exemplary electrical block diagram of a messaging system in accordance with the present invention.

FIG. 1 is an exemplary electrical block diagram of a messaging system in accordance with the present invention. The messaging system comprises a plurality of conventional subscriber units 102, which communicate by radio with a fixed portion of the radio system, comprising a plurality of conventional base stations 104, a plurality of local controllers 110, and a home controller 120. The base stations 104 are coupled via communication links 106 to the plurality of local controllers 110 for control by and communication with the plurality of local controllers 110 utilizing well-known techniques. The home controller 120 preferably is similarly coupled to one or more base stations 104, as well, for transmitting messages in the vicinity of the home controller 120. The local controllers 110 are coupled to a home controller 120 via communication links 122 and via a conventional communication network 108 for communicating with the home controller 120. The home controller 120 and the local controllers 110 preferably communicate by utilizing a well-known protocol, e.g., the Telocator Network Paging Protocol (TNPP), the Wireless Messaging transfer Protocol (WMtp™), or the InterPaging Networking Protocol (IPNP). The hardware of the home controller 120 and hardware of the local controllers 110 can be identical to one another.

From the subscriber unit's point of view, the home controller 120 is the controller with which the subscriber unit 102 is permanently registered with the messaging system in the "home" area. The home controller 120 contains the full subscriber information defining the service to be provided to the subscriber unit 102 stored within a local subscriber information database of the home controller 120. The local controllers 110 preferably can receive and process incoming message originations intended for the subscriber unit 102. The local controllers 110 do not contain the full subscriber information of the subscriber unit 102, but each can contain the full subscriber information for another subset of subscriber units 102 in a local subscriber information database 228 (FIG. 2). Thus, from the point of view of the other subset of subscriber units 102, the home controller 120 becomes a local controller 110 and the local controller 110 becomes the home controller 120. To simplify the following discussion, let us view the messaging system from the point of view of a single subset of subscriber units 102, all of which are permanently registered to the home controller 120 and can receive message originations through the local controllers 110.

The home controller 120 and the local controllers 110 are preferably coupled via telephone links 126 to a plurality of public switched telephone networks (PSTNs) 112 for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controller 120 and to the local controllers 110.

The subscriber units 102 preferably include the Tenor™ and PageFinder™ subscriber units manufactured by Motorola, Inc. The hardware of the home controller 120 and the local controllers is preferably similar to the Wireless Messaging Gateway (WMG™) Administrator! paging terminal also manufactured by Motorola, Inc. of Schaumburg, Ill.. The hardware of the base stations 104 is preferably similar to that of the RF-Orchestra!™ transmitter manufactured by Motorola, Inc. It will be appreciated that other similar hardware can be utilized as well for the subscriber units 102, the home controller 120, the local controllers 110, and the base stations 104.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well.

Referring to FIG. 2, an exemplary electrical block diagram depicts the local controller 110 in accordance with the present invention, comprising a conventional input interface 218 for receiving a message from a message originator via the telephone link 126. The local controller 110 further comprises a processing system 210 coupled to the input interface 218 for processing the message. The local controller 110 also includes a conventional base station interface 206 coupled to the processing system 210 for controlling and communicating with the base stations 104 to transmit the message using well-known techniques. In addition, the local controller 110 includes a communications interface 204 for communicating with the home controller 120 via the communication network 108 and the communication links 122. It will be appreciated that, alternatively, two or more of the communications interface 204, the base station interface 206, and the input interface 218 can be combined into a single multi-purpose interface.

The processing system 210 comprises a conventional computer system 212 and a conventional mass medium 214 programmed with a database and software elements for controlling the processing system 210 in accordance with the present invention. The software elements include a message processing element 220 for processing the message in accordance with the present invention. The database comprises subscriber range templates 222, dummy subscriber information records 226, and local subscriber information records 228, the latter containing subscriber information records for subscriber units 102 that are registered as "home" subscriber units 102 of this local controller 110. These elements and their operation are described further below.

FIG. 3 is a timing diagram 300 depicting communications required in a prior art messaging system for entering a message at a local controller. The vertical lines 302, 304, 306 represent the local message originator, the first (or local) controller, and the second (or home) controller, respectively. First, the local message originator dials 308 the desired subscriber number. The local controller determines that the dialed subscriber number is not in its local subscriber database, and, in response, must request 310 the subscriber information from the home controller via the communication network coupling the local and home controllers. In response, the home controller returns 312 to the local controller the subscriber information record corresponding to the subscriber number. The local controller then prompts 314 the message originator to enter the message. The message originator then enters 316 the message. The local controller then forwards 318 a message request to the home controller, which is responsible for keeping track of the subscriber's whereabouts and billing records. The home controller responds 320 with an acknowledgment, which can be either positive or negative, depending upon the further processing of the message request by the home controller. The local controller then forwards 322 the acknowledgment as a status indication to the message originator.

Figure 4:
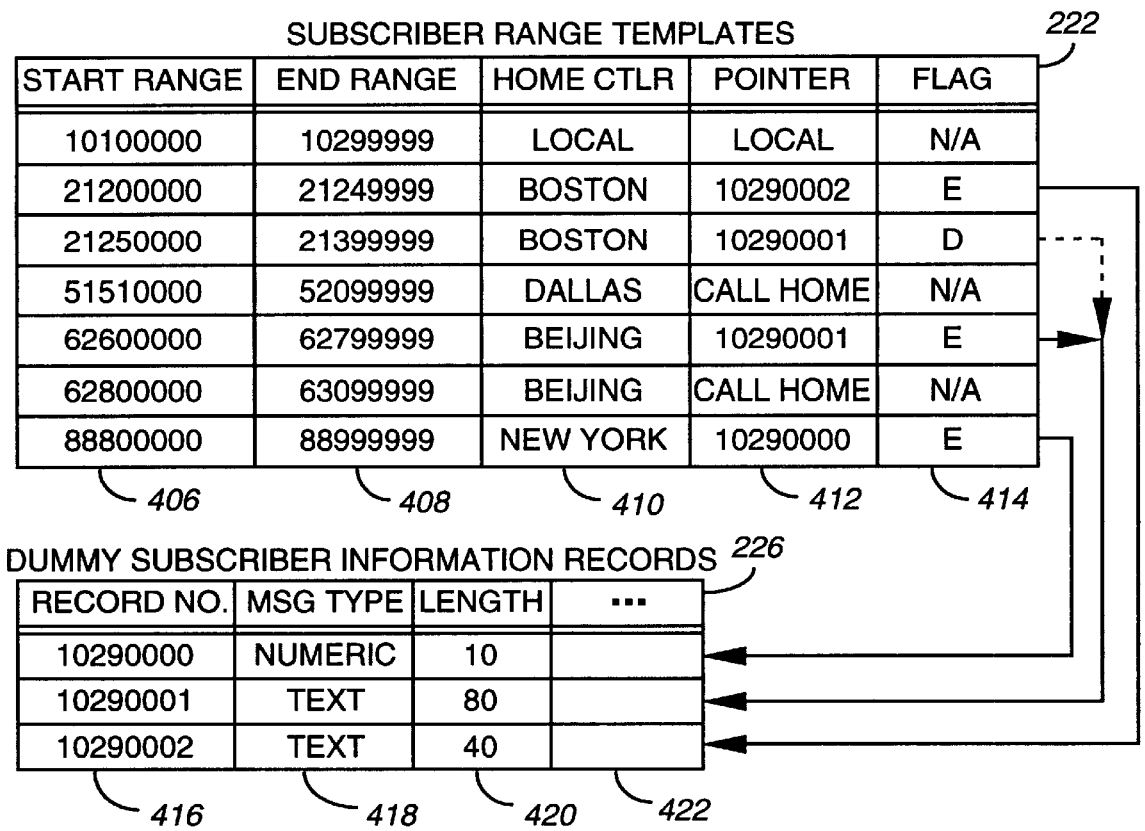
FIG. 4 is an exemplary database structure diagram in accordance with the present invention.

The call hold time 324 includes the time required for the foregoing communications to take place. It is desirable for the call hold time 324 to be as small as possible, so that the message originator does not have to wait long for the status notification. An advantage of the present invention, as will become clear further below, is the elimination of the request 310 for subscriber information and the return 312 of the subscriber information. The elimination of these two communications in accordance with the present invention advantageously minimizes the call hold time and reduces costly traffic through the communications network. FIG. 4 is an exemplary database structure diagram 400 in accordance with the present invention. The diagram 400 includes an expanded view of the subscriber range templates 222 and the dummy subscriber information records 226 of the local controller 110. Each template (depicted as a row) of the subscriber range templates 222 preferably comprises a start range number 406, an end range number 408, a home controller identifier 410, a pointer 412, and a flag 414. As implied by the names, the start range number 406 and the end range number 408 correspond to the lowest and highest subscriber numbers of a range of subscriber numbers to which the template record applies. The home controller identifier 410 identifies the home controller 120 to which the range of numbers is uniquely assigned in the messaging system. The pointer 412 identifies an entry in the dummy subscriber information records 226 which is compatible with the features and capabilities of the subscriber units 102 corresponding to the range of numbers of the template containing the pointer 412. The entry of the dummy subscriber information records 226 preferably contains sufficient subscriber information to allow entry of a message without the need to contact the home controller 120. Alternatively, the pointer 412 can point to the home controller 120, e.g., "CALL HOME", whenever dummy subscriber information cannot be used, for whatever reason. The flag 414 is optional and can be used to temporarily enable and subscriber range tem subscriber range templates 222. When the flag 414 indicates that the record is disabled (D), the pointer 412 of the record is unchanged, but the action taken by the local controller 110 is the same as if the pointer points to the home controller 120. When the flag 414 is re-enabled (E), the local controller 110 then accesses the dummy subscriber information record 226 pointed to by the pointer 412.

The dummy subscriber information records 226 preferably are identical in length and structure to the records of the local subscriber information database 228, and thus advantageously can define every controllable feature of subscriber service that can be defined for a subscriber. For simplicity, the exemplary diagram 400 depicts a reduced amount of subscriber information for the dummy subscriber information records 226, specifically a record number 416, a message type 418, and a maximum message length 420. It will be appreciated that additional subscriber features 422, e.g., priority, can be entered into the record if desired by a service provider.

Application of the diagram 400 is straightforward. If the local controller receives, for example, a message origination intended for a subscriber number in the range 10100000–10299999, then the subscriber number is a local "home" number, and the subscriber information is determined from the local subscriber information database 228 of the local controller 110. Call processing then continues in accordance with the local database record corresponding to the subscriber number. If, for example, the subscriber number is in the range 21200000–21249999, the home controller is the Boston home controller, and the pointer (10290002) points to a dummy subscriber information record that indicates that the message is of type "text" and the maximum length is 40 characters. This information advantageously is sufficient for the local controller 110 to prompt the message originator to enter the message, without a need to contact the home controller 120 in Boston.

Figure 5:
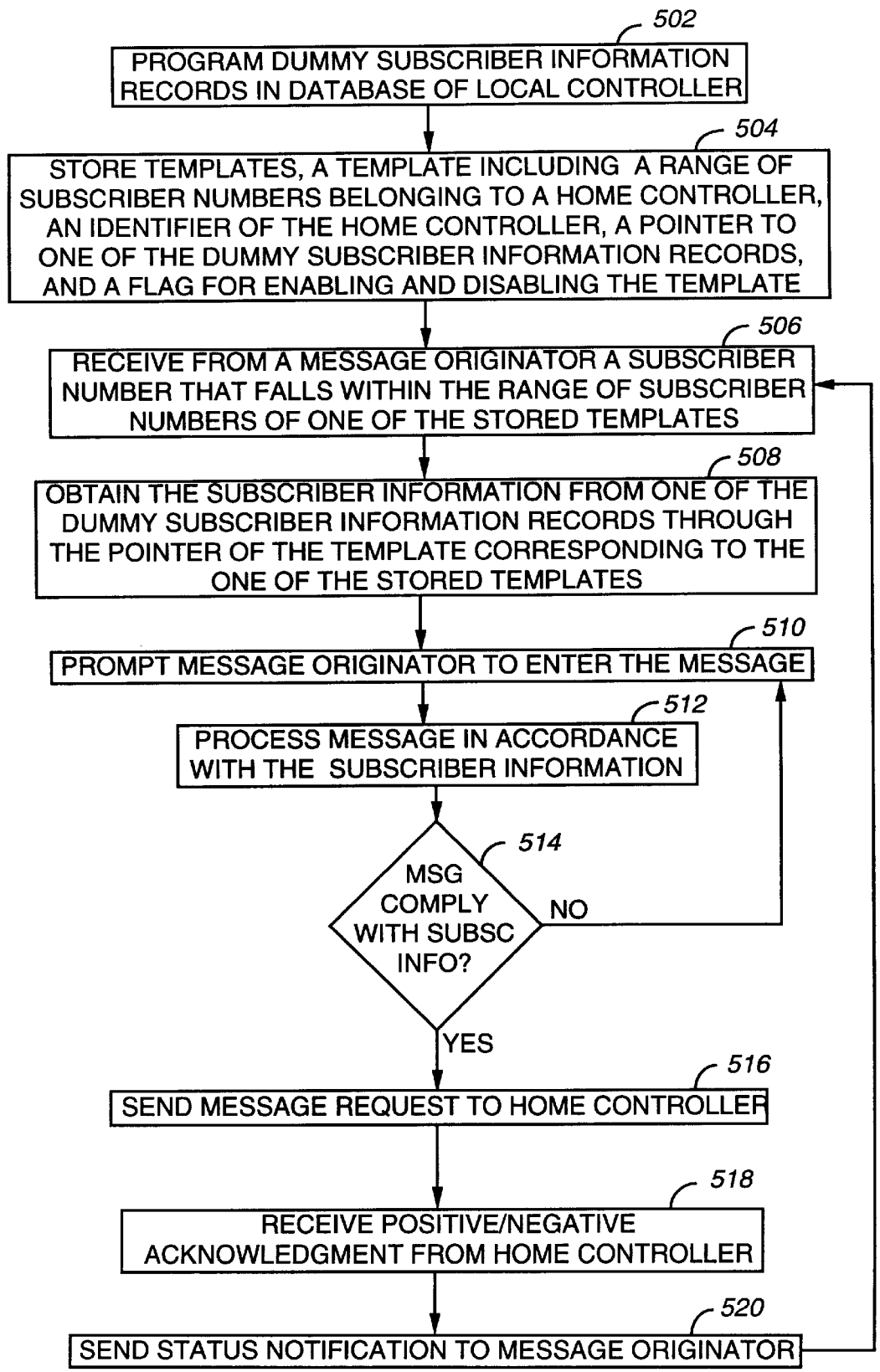
FIG. 5 is an exemplary flow diagram depicting operation of a local controller in accordance with the present invention.

FIG. 5 is an exemplary flow diagram 500 depicting operation of the local controller 110 in accordance with the present invention. The flow begins with programming 502 the dummy subscriber information records 226 into the database of the local controller 110. This is preferably accomplished through a local keyboard/display terminal (not shown), using well-known techniques. Next, the subscriber range templates 222 are defined and stored 504 in the database, also preferably through the local keyboard/display terminal. It will be appreciated that some overall system planning and coordination is desirable for preventing overlap of subscriber numbers in the messaging system and for minimizing the number of subscriber range templates 222 required.

Next, the local controller 110 receives 506 from a message originator a subscriber number that falls within the start and end ranges 406, 408 of subscriber numbers of one of the (non-local) subscriber range templates 222. In response, the local controller 110 obtains 508 the subscriber information from one of the dummy subscriber information records 226 having a record number 416 corresponding to the pointer 412. The local controller 110 then prompts 510 the message originator to enter the message. The local controller 110 then checks 514 whether the message complies with the subscriber information, e.g., message type and length. If not, the local controller 110 again prompts 510 the message originator to enter the message. It will be appreciated that the prompt can include an error message explaining why the message was noncompliant, and that the loop comprising steps 510–512–514 can be limited to a maximum number of retries, e.g., 3 retries. If, on the other hand, in step 514 the message complies with the subscriber information, then the local controller 110 submits 516 a message request including the message to the home controller 120 indicated by the home controller identifier 410 of the subscriber range template 222. The local controller 110 next receives 518 a positive or negative acknowledgment from the home controller, 120, depending upon the further processing of the message by the home controller 120. In response to the acknowledgment, the local controller 110 sends 520 a status notification to the message originator, indicating, for example, whether the message has been sent.

Note that in comparison to the communications required in the prior art messaging system for entering a message at a local controller, as depicted in FIG. 3, the present invention eliminates the request 310 for subscriber information from the home controller and the return 312 of the subscriber information from the home controller. The elimination of these communications advantageously reduces the call hold time and reduces the network traffic required for originating a message through a local controller 110 when the message is intended for a subscriber unit 102 that is not a "home" subscriber unit 102 of the local controller 110.

Thus it should be apparent from the foregoing disclosure that the present invention provides a method and apparatus that minimizes the delays and costs associated with communications required to obtain subscriber information for messages entered at the local controllers 110 of distributed messaging systems, while also providing sufficient flexibility to accommodate a variety of subscriber unit types and capabilities.

Many modifications and variations of the present invention are possible in light of the above teachings. For example, the flag 414 can be omitted, if desired. Additional subscriber information parameters can be included in the dummy subscriber information records 226 beyond that depicted in the exemplary database structure diagram 400. Many other variations will occur to one of ordinary skill in the art, given the teachings of the preceding disclosure. Thus, it is to be understood that, within the scope of the appended claims, the invention can be practiced other than as described herein above for the exemplary embodiments.

What is claimed is:

1. A method in a distributed messaging system for reducing networking traffic required to obtain subscriber information, the method comprising the steps of:

programming a plurality of dummy subscriber information records into a first database of a first controller;

storing in the first database a plurality of templates, a template comprising a lowest subscriber number and a highest subscriber number of a contiguous range of subscriber numbers to which the template, applies the range of subscriber numbers belonging to a second plurality of subscribers having their subscriber information programmed into a second database of a second controller, the template further comprising a pointer to a corresponding one of the plurality of dummy subscriber information records;

receiving, by the first controller from a message originator, a subscriber number that falls within the range of subscriber numbers of one of the plurality of templates; and obtaining the subscriber information from a corresponding one of the plurality of dummy subscriber information records through the pointer of the one of the plurality of templates.

2. The method of claim 1, wherein the storing step comprises the step of storing for at least one of the plurality of templates an indicator that the second controller is to be contacted for obtaining the subscriber information; and wherein the obtaining step comprises the step of contacting the second controller to obtain the subscriber information, in response to finding the indicator through the one of the plurality of templates.

3. The method of claim 1, wherein the second controller is a plurality of controllers, and wherein the storing step comprises the step of storing a plurality of identifiers of the plurality of controllers corresponding to the plurality of templates.

4. The method of claim 1, wherein the storing step comprises the step of storing a plurality of flags corresponding to the plurality of templates for enabling and disabling selected ones of the plurality of templates.

5. The method of claim 1, further comprising the steps of:

prompting the message originator to enter a message, in response to obtaining the subscriber information; and processing the message in accordance with the subscriber information.

6. The method of claim 5, further comprising the step of submitting the message to the second controller in response to the message being in compliance with the subscriber information.

7. The method of claim 6, further comprising the step of receiving, by the first controller from the second controller, an acknowledgment selected from a positive acknowledgment and a negative acknowledgment, in response to the message being processed by the second controller.

8. The method of claim 7, further comprising the step of sending a status notification from the first controller to the message originator, in response to receiving the acknowledgment.

9. A first controller in a distributed messaging system for reducing networking traffic required to obtain subscriber information, the first controller comprising:

an input interface for receiving a message from a message originator;

a processing system coupled to the input interface for processing the message, the processing system including a memory for storing a first database; and a communications interface coupled to the processing system and coupled to a second controller for communicating with the second controller, wherein the first database includes a plurality of dummy subscriber information records, and wherein the first database also includes a plurality of templates, a template comprising a lowest subscriber number and a highest subscriber number of a contiguous range of subscriber numbers to which the template applies, the range of subscriber numbers belonging to a second plurality of subscribers having their subscriber information programmed into a second database of the second controller, the template further comprising a pointer to a corresponding one of the plurality of dummy subscriber information records, and wherein the processing system is programmed to obtain the subscriber information from a corresponding one of the plurality of dummy subscriber information records through the pointer of one of the plurality of templates, in response to receiving from the message originator a subscriber number that falls within the range of subscriber numbers of the one of the plurality of templates.

10. The first controller of claim 9, wherein the memory also includes for at least one of the plurality of templates an indicator that the second controller is to be contacted for obtaining the subscriber information; and wherein the processing system is further programmed to contact the second controller to obtain the subscriber information, in response to finding the indicator through the one of the plurality of templates.

11. The first controller of claim 9, wherein the second controller is a plurality of controllers, and wherein the memory also includes a plurality of identifiers of the plurality of controllers corresponding to the plurality of templates.

12. The first controller of claim 9, wherein the memory also includes a plurality of flags corresponding to the plurality of templates for enabling and disabling selected ones of the plurality of templates.

13. The first controller of claim 9, wherein the processing system is further programmed to:

cooperate with the input interface to prompt the message originator to enter the message, in response to obtaining the subscriber information; and process the message in accordance with the subscriber information.

14. The first controller of claim 13, wherein the processing system is further programmed to cooperate with the communications interface to submit the message to the second controller in response to the message being in compliance with the subscriber information.

15. The first controller of claim 14, wherein the processing system is further programmed to cooperate with the communications interface to receive from the second controller an acknowledgment selected from a positive acknowledgment and a negative acknowledgment, in response to the message being processed by the second controller.

16. The first controller of claim 15, wherein the processing system is further programmed to cooperate with the input interface to send a status notification from the first controller to the message originator, in response to receiving the acknowledgment.

* * * * *